Nov. 12, 1940.    G. SCHMITT    2,221,113
LAWN SEED DISTRIBUTOR
Filed March 18, 1939
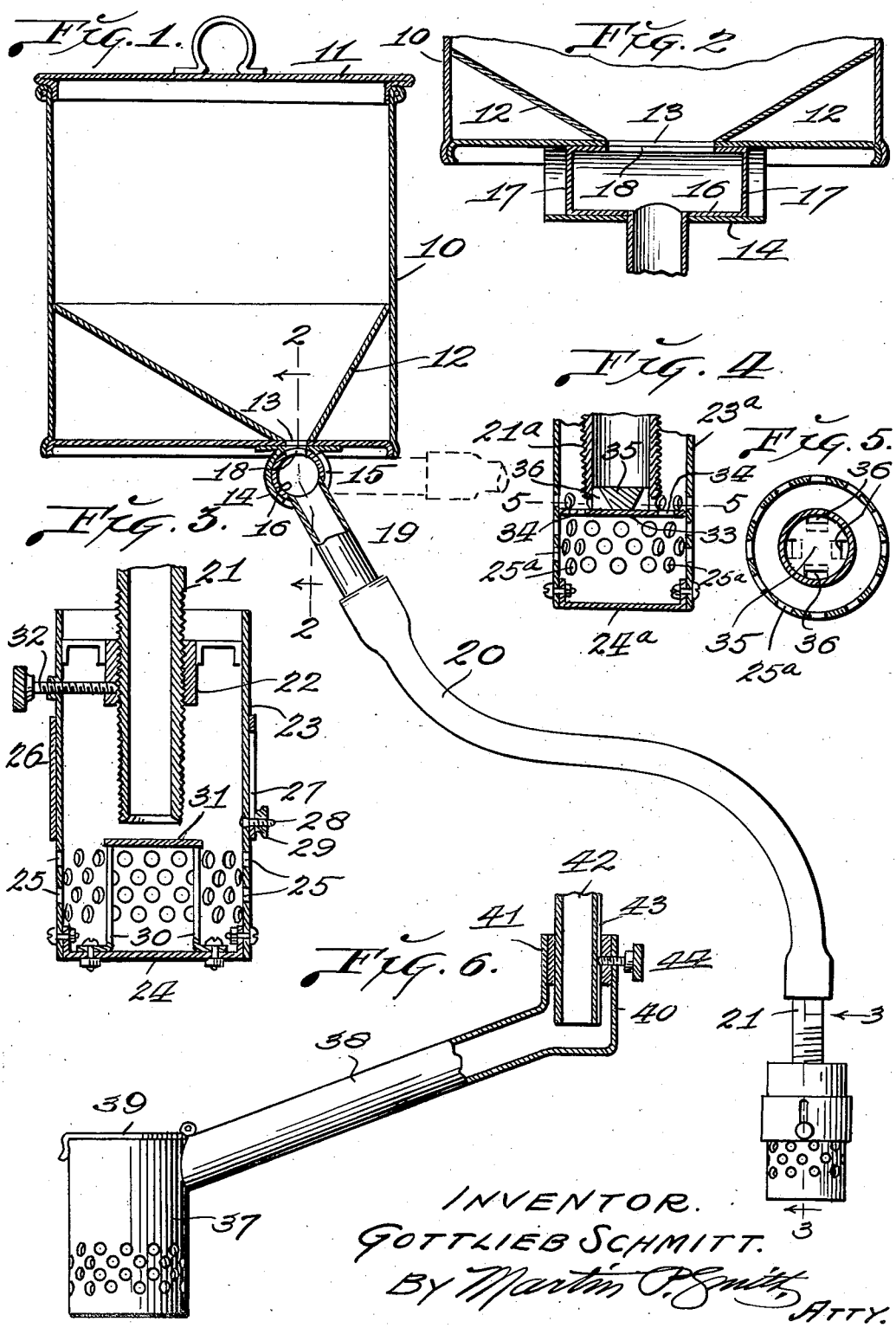
INVENTOR.
GOTTLIEB SCHMITT.
By Martin P. Smith, ATTY.

Patented Nov. 12, 1940

2,221,113

UNITED STATES PATENT OFFICE 2,221,113

LAWN SEED DISTRIBUTOR

Gottlieb Schmitt, Los Angeles, Calif.

Application March 18, 1939, Serial No. 262,791

4 Claims. (Cl. 275—11)

My invention relates to a seed distributor and has for its principal object the provision of a relatively simple, practical and efficient device that is designed to be conveniently carried by the user and which, when properly manipulated, will be effective in scattering grass and clover seed, millet, in fact, any small seed, or pulverized or granulated chemical fertilizer.

Further objects of my invention are, to provide a seed distributor having means for very accurately controlling the discharge of the seed through and from the device, further, to construct the device so that the discharge of seed is uniform from the discharge head or nozzle and further, to provide a seed distributing device of the character referred to that may be inexpensively manufactured and marketed and at the same time being of strong, durable construction and highly efficient in use.

With the foregoing and other objects in view, my invention consists in certain novel features of construction and arrangement of parts that will be hereinafter more fully described and claimed and illustrated in the accompanying drawing in which:

Fig. 1 is a side elevational view of a seed distributor constructed in accordance with my invention and showing the receptacle for the seed in vertical section.

Fig. 2 is a cross section taken on the line 2—2 of Fig. 1.

Fig. 3 is an enlarged vertical section taken on the line 3—3 of Fig. 1.

Fig. 4 is a vertical section taken through the lower portion of a modified form of the seed distributing head or nozzle.

Fig. 5 is a cross section taken on the line 5—5 of Fig. 4.

Fig. 6 is a side elevational view partly in section of a modified form of the distributing head or nozzle.

Referring by numerals to the accompanying drawing, 10 designates the container for the seed that is to be distributed, said container being preferably formed from light weight sheet metal, fiber board, or the like, and removably applied to the upper end of said container is a cover 11. This container is provided with a substantially cone-shaped bottom 12, at the lower end of which is formed an opening 13 that permits the seed to discharge from the container. Suitably secured to the bottom of the container below the outlet opening therein is a tubular member 14, in the central portion of which is formed a slot 15 disposed at right angles to the axis of the tube and said slot being approximately 180 degrees in length.

Arranged for rotation within the tube 14, is a short tubular member 16 having closed ends 17 and, formed in the upper portion of this tube 16 is a slot 18 that is adapted to register with the outlet opening 13 in bottom 12.

Secured to the central portion of the tube 16 and projecting through the arcuate slot 15 is a short tube 19 and, detachably mounted on the end thereof is one end of a flexible tube 20 which may be formed of rubber, a combination of rubber and fabric, or from a coiled strip of thin sheet metal.

The opposite end of flexible tube 20 is detachably mounted on the end of a short tube 21, the lower portion of which is externally threaded in order that it may be screw seated in a nut or collar 22, which latter is secured in any suitable manner in the upper portion of a distributing head or nozzle from which the seed discharges and falls onto the lawn or ground. This distributing head or nozzle comprises a short tubular body 23, preferably formed of sheet metal, open at its upper end and closed by a plate 24 at its lower end.

Formed through the wall of member 23 just above its closed lower end are circular rows of perforations 25 through which the seed passes as it is distributed.

Arranged for sliding movement on the tubular body 23, is a sleeve 26 provided with a longitudinally disposed slot 27 for the reception of a threaded stud 28 that projects from the wall of member 23 and, screw seated on the outer portion of this stud is a nut 29 which, when tightened, clamps the sleeve 26 to member 23. This sleeve is moved downward to close all of the apertures 25 and thus prevent loss of seed while the seed distributor is not in use.

In Fig. 3, the sleeve 26 is shown in elevated position so that seed is free to discharge through all of the apertures 25. Supported by legs 30 that project upwardly from plate 24 is a plate 31 that occupies a plane adjacent or just above the plane occupied by the upper row of seed discharge apertures 25 and, this plate which is considerably smaller in diameter than the internal diameter of the head 23 acts as a baffle plate and spreader for the seed that is delivered into the distributing head through flexible tube 20 and tube 21.

By providing a threaded connection between the distributor head 23 and the tube 21, said head may be screwed upwardly or downwardly on tube 21 so as to vary the distance between the lower discharge end of tube 21 and the plate 31 and, when proper adjustment of this space has been accomplished the distributor head may be clamped to the tube 21 by means of a set screw 32 that is screw seated in the wall of the head 23 and in the nut 22 and, the point of which said screw is adapted to engage the tube 21 (see Fig. 3).

The tube 16 is arranged for rotary movement in the tubular housing 14 in order that the tube 19 may be moved from a substantially vertical position into a horizontal position beneath the bottom of container 10, thus enabling said container to be conveniently filled with the seed that is to be distributed and, when tube 19 occupies a horizontal position beneath the container as illustrated by dotted lines in Fig. 1, the opening 18 in the top of tube 16 is out of registration with the discharge opening 13 in the bottom of the container so that seed can not discharge into tube 16.

After the container has been filled or partially filled with seed, said container is supported under the arm of the user and, to distribute the seed the tube 19 is swung downwardly to bring aperture 18 into registration with discharge opening 13 so that seed will flow from the container through tubes 16, 19, and flexible tube 20, and, as the seed enters the lower portion of the distributing head 23, the user swings said head from one side to the other, or in small circular paths so as to effect a uniform distribution of the seed over the lawn or ground and which seed it will be understood, discharges from the distributing head 23 through the apertures 25.

The tube 16 mounted for rotation in tubular housing 14 and provided with the aperture 18 that is adapted to register with outlet opening 13 constitutes an adjustable valve for controlling the discharge of seed from the container 10, while the adjustment of the distributing head on the tube 21 is so as to vary the space between the lower end of said tube and plate 31, provides for controlling the volume flow of seed into the lower portion of the distributing head and, the sleeve 26 which is adjustable with respect to the discharge apertures 25 controls the amount of seed that discharges from the head or nozzle.

In the modified construction illustrated in Figs. 4 and 5, the body 23a of the distributor head or nozzle is closed at its lower end by a plate 24a and, formed through the wall of the lower portion of the tubular body 23a is a series of circular rows of seed discharge apertures 25a.

Secured within the tubular body 23a between the uppermost row of apertures 25a and the next lower row of apertures is a plate 33 and, formed therethrough adjacent the wall of body 23a is a circular row of apertures 34.

Secured on top of the central portion of plate 33 is a disc 35, in the edge of which is formed a plurality of notches 36, the inner faces thereof being inclined from the top of the disc inwardly toward the center thereof so that the horizontal cross sectional area of said notches gradually increases toward their lower ends.

The diameter of disc 35 is such that it will slide readily within the lower end of the threaded tube 21a that supports the distributing head 23a and, by adjusting said head vertically on tube 21a, the notches 36 are opened or closed so as to regulate the discharge of seed therethrough and, after discharging from said notches the seed is free to pass downwardly through the apertures 34 and also outwardly through the upper row of apertures 25a.

Obviously, as the distributing head is moved from side to side, or in small circular paths, the seed will discharge from the apertures 25a onto the lawn or ground.

In the modified construction illustrated in Fig. 6, a distributing head or nozzle 37 similar in construction to the head 23, but without the nut 22 for the reception of tube 21, is secured to one end of a tube 38, the latter being preferably formed of metal and, this tube extends upwardly away from the upper portion of the head 37 at an angle of about fifteen degrees. The upper end of the distributing head 37 is closed by a hinged lid or cover 39. Secured to the upper end of the inclined tube 38, is a short tube 40 provided in its upper portion with a bushing 41 through which is arranged to slide a tube 42 which corresponds with the tube 21 and said tube 42 being carried by the lower end of a flexible tube (not shown) similar to tube 20.

Formed in the outer surface of tube 42 is a vertically disposed groove 43 that is adapted to receive the inner end of a set screw 44, the latter being screw seated in member 40 and the bushing 41. Thus member 40 may be adjusted vertically on tube 42 so as to regulate the distance between the lower end of said tube 42 and the bottom of housing 40, thus controlling the volume flow of seed from the lower end of tube 42 and, the parts may be secured in their adjusted positions by tightening set screw 44.

In the construction just described and illustrated in Fig. 6, tube 38 provides a convenient handle that may be grasped by the user's hand during distribution of seed over the lawn or ground.

Thus it will be seen that I have provided a lawn seed distributor that is relatively simple in construction, inexpensive of manufacture, capable of being easily and conveniently manipulated and very effective in performing the functions for which it is intended.

While particularly intended for distributing grass seed, clover seed, and the like, as well as pulverized or granulated chemical fertilizer, or powdered insecticide, the distributor made in larger sizes and provided with discharge apertures of larger size, may be advantageously employed for distributing grain, such as wheat, oats, barley, and the like.

It will be understood that minor changes in the size, form and construction of the various parts of my improved lawn seed distributor, may be made and substituted for those herein shown and described, without departing from the spirit of my invention, the scope of which is set forth in the appended claims.

I claim as my invention:

1. In a seed distributor, a container provided in its bottom with an outlet opening, a flexible tube connected to said container and having communication with the opening in the bottom thereof, a tubular member seated in the other end of the flexible tube, a seed distributing head adjustably mounted on the tubular member that is seated in said flexible tube, said distributing head comprising a cylindrical wall and a bottom plate fixed therein, a combined baffle plate and spreader arranged in the lower portion of said distributor head, the lower portion of the wall of said distributor head being perforated and adjustable means for controlling the flow of seed through said perforations.

2. In a seed distributor, the combination with a flexible seed conduit, of a seed distributing head adjustably mounted on the end of said conduit, said head comprising a cylindrical wall and a bottom plate, a seed deflecting plate secured within the lower portion of said head and occupying a position below the discharge end of said conduit so that said seed deflecting plate moves toward or away from the discharge end of the seed conduit as the distributing head is adjusted thereupon and the lower portion of the wall of said head being provided with seed discharge openings.

3. A seed distributor as set forth in claim 2, with means adjustably mounted on the seed distributing head for controlling the discharge of seed through the openings in said head.

4. In a seed distributor, the combination with a flexible seed conduit, of a distributor head adjustably mounted on one end of said conduit which head comprises a cylindrical wall and a bottom plate, means for securing said head to said conduit in differently adjusted positions, the lower portion of the wall of said head being provided with seed outlet openings and means secured within the lower portion of said distributor head for directing and for controlling the flow of seed through said outlet openings.

GOTTLIEB SCHMITT.